US009418486B2

(12) United States Patent
Cho et al.

(10) Patent No.: US 9,418,486 B2
(45) Date of Patent: Aug. 16, 2016

(54) METHOD AND APPARATUS FOR RENDERING HYBRID MULTI-VIEW

(71) Applicant: SAMSUNG ELECTRONICS CO., LTD., Suwon-si, Gyeonggi-do (KR)

(72) Inventors: Yang Ho Cho, Seongnam-si (KR); Ho Young Lee, Suwon-si (KR); Ji Won Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 116 days.

(21) Appl. No.: 14/017,962

(22) Filed: Sep. 4, 2013

(65) Prior Publication Data

US 2014/0177943 A1   Jun. 26, 2014

(30) Foreign Application Priority Data

Dec. 20, 2012   (KR) .................. 10-2012-0149886

(51) Int. Cl.
  *G06K 9/00*   (2006.01)
  *G06T 19/20*   (2011.01)
  *H04N 13/00*   (2006.01)

(52) U.S. Cl.
  CPC ............ *G06T 19/20* (2013.01); *H04N 13/0011* (2013.01)

(58) Field of Classification Search
  USPC ............................................ 382/154; 348/49
  See application file for complete search history.

(56) References Cited

U.S. PATENT DOCUMENTS

| | | | |
|---|---|---|---|
| 2005/0105610 A1* | 5/2005 | Sung ..................... 375/240.01 |
| 2009/0022393 A1* | 1/2009 | Bar-Zohar et al. ............ 382/154 |
| 2011/0254927 A1 | 10/2011 | Yahata et al. |
| 2012/0051624 A1* | 3/2012 | Ando ................ H04N 13/0239 382/154 |
| 2013/0038701 A1* | 2/2013 | Hung et al. ..................... 348/49 |
| 2013/0050187 A1* | 2/2013 | Korcsok et al. ............... 345/419 |
| 2013/0208976 A1* | 8/2013 | Cook ............................. 382/154 |
| 2013/0314501 A1* | 11/2013 | Davidson et al. ............... 348/46 |
| 2014/0118501 A1* | 5/2014 | Kim et al. ........................ 348/46 |

FOREIGN PATENT DOCUMENTS

| | | |
|---|---|---|
| CN | 102478756 A | 5/2012 |
| CN | 102687178 A | 9/2012 |
| CN | 102835116 A | 12/2012 |
| EP | 2 393 298 | 12/2011 |
| EP | 2 477 158 A1 | 7/2012 |
| JP | 2004-048725 | 2/2004 |
| JP | 2006-113807 | 4/2006 |
| KR | 10-0636785 | 10/2006 |
| KR | 10-0667830 | 1/2007 |
| KR | 10-0801968 | 1/2008 |
| KR | 10-2008-0088305 | 10/2008 |

(Continued)

OTHER PUBLICATIONS

Extended European Search Report mailed Oct. 23, 2014 in counterpart European Application No. 13198887.5 (7 pages, in English).

(Continued)

*Primary Examiner* — John Strege
(74) *Attorney, Agent, or Firm* — NSIP Law

(57) ABSTRACT

A method and apparatus for generating a multi-view image, the method including determining an input image for generating multi-view images, and selecting a total of stereo images or one of stereo images to be the input image based on a presence of a distortion between the stereo images.

19 Claims, 9 Drawing Sheets

(56) References Cited

FOREIGN PATENT DOCUMENTS

| | | |
|---|---|---|
| KR | 10-2012-0095136 A | 8/2012 |
| WO | WO 2012/029301 A1 | 3/2012 |

OTHER PUBLICATIONS

Chinese Office Action issued on Jan. 27, 2016 in counterpart Chinese Application No. 201310683685.X. (21 pages with English translation).

* cited by examiner

METHOD AND APPARATUS FOR RENDERING HYBRID MULTI-VIEW

CROSS-REFERENCE TO RELATED APPLICATIONS

This application claims the priority benefit of Korean Patent Application No. 10-2012-0149886, filed on Dec. 20, 2012, in the Korean Intellectual Property Office, the disclosure of which is incorporated herein by reference.

BACKGROUND

1. Field

Example embodiments of the following disclosure relate to a method and apparatus for processing an image, and more particularly, to a method and apparatus for generating a multi-view image.

2. Description of the Related Art

Generally, three-dimensional (3D) contents may be generated by using images captured by a stereo camera. Here, the images captured by the stereo camera may be referred to as stereo images.

A view synthesis process may be required to play the 3D contents in a multi-view display. The view synthesis process may include generating a multi-view image using the stereo images.

However, a distortion between a left image and a right image of the stereo images may occur. As an example, the distortion may include a color distortion and a geometric distortion. In this instance, an image quality degradation issue may arise in the generated multi-view image, due to the distortion, when the multi-view image is generated using both the left image and the right image.

SUMMARY

The foregoing and/or other aspects are achieved by providing a method for processing an image, performed by an apparatus for processing an image, the method including determining a presence of a distortion between plural images, including a first image and a second image, determining at least one of the first image and the second image to be an image to be used for generating a third image, based on the presence of the distortion, and generating the third image using the at least one image determined.

A viewpoint of the third image may be distinct from a viewpoint of the first image and a viewpoint of the second image.

The distortion may be a color distortion between the first image and the second image.

The presence of the distortion may be determined based on a difference between a color of a first pixel of the first image and a color of a second pixel of the second image, and the first pixel and the second pixel correspond to one another.

The pixels corresponding to one another may be pixels having an identical coordinate, when the second image is warped to the viewpoint of the first image, among pixels of the warped second image and pixels of the first image.

The distortion may be a geometric distortion between the first image and the second image.

The determining of the at least one of the first image and the second image may include determining one of the first image and the second image to be an image to be used for generating a third image when the distortion is present, and when the distortion is absent, determining a total of the first image and the second image to be an image to be used for generating the third image.

The method for processing the image may further include estimating a disparity of the first image and a disparity of the second image, wherein the determining of the at least one of the first image and the second image comprises determining a presence of the distortion based on the estimated disparity of the first image and the estimated disparity of the second image.

The estimating of the disparity may include estimating a disparity of a first line and respective disparities of a plurality of second lines with respect to the first line of the first image and the plurality of second lines of the second image, and the determining of the at least one of the first image and the second image comprises determining the distortion to be present when a y-coordinate of the first line differs from a y-coordinate of a line matched to the first line among the plurality of second lines, wherein the line matched to the first line has a value of matching error of second lines is at a minimum.

A y-coordinate of the plurality of second lines may be located in a predetermined range in which the y-coordinate of the first line is at a center.

The third image may be plural, i.e., there may be a plurality of third images, and respective disparities of the plurality of third images is determined based on a comparison between a range of a disparity representable by the apparatus for processing the image and a range of the at least one image determined.

The range of the disparity of the at least one image determined may be determined based on the range of the disparity of the determined at least one image, calculated from a plurality of viewpoints.

The plurality of viewpoints for the plurality of third images may be generated to be within a range of a viewpoint corresponding to a representable disparity range.

A fourth image may be generated by applying interpolation to the first image and the second image.

The foregoing and/or other aspects are achieved by providing an apparatus for processing an image, the apparatus including a distortion determining unit to determine a presence of a distortion between a first image and a second image, an image determining unit to determine at least one of the first image and the second image to be an image to be used for generating a third image, based on the presence of the distortion, and an image generating unit to generate the third image using the at least one image determined.

The distortion determining unit may determine the presence of the distortion based on a difference between a color of a first pixel of the first image and a color of a second pixel of the second image, and the first pixel and the second pixel may correspond to one another.

The pixels corresponding to one another may be pixels having an identical coordinate, when the second image is warped to a viewpoint of the first image, among pixels of the warped second image and pixels of the first image.

The image determining unit may determine one of the first image and the second image to be an image to be used for generating a third image when the distortion is present, and when the distortion is absent, a total of the first image and the second image may be determined to be an image to be used for generating the third image.

The apparatus for processing the image may further include a disparity estimating unit to estimate a disparity of the first image and a disparity of the second image, wherein the distortion determining unit determines a presence of the distortion based on the estimated disparity of the first image and the estimated disparity of the second image.

The disparity estimating unit may estimate a disparity of a first line and respective disparities of a plurality of second lines with respect to the first line of the first image and the plurality of second lines of the second image, and the distortion determining unit may determine the distortion to be present when a y-coordinate of the first line differs from a y-coordinate of a line matched to the first line among the plurality of second lines, wherein a matching error value of the line matched to the first line with the first line among the plurality of second lines is at a minimum.

The matching error may be a degree to which complete matching is not performed in matching of lines.

The foregoing and/or other aspects are achieved by providing a method for generating a multi-view image, the method including: selecting, by a processor, a total of plural images or one of the plural images, based on a presence of a distortion between the plural images; and generating the multi-view image based on a result of the selecting.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
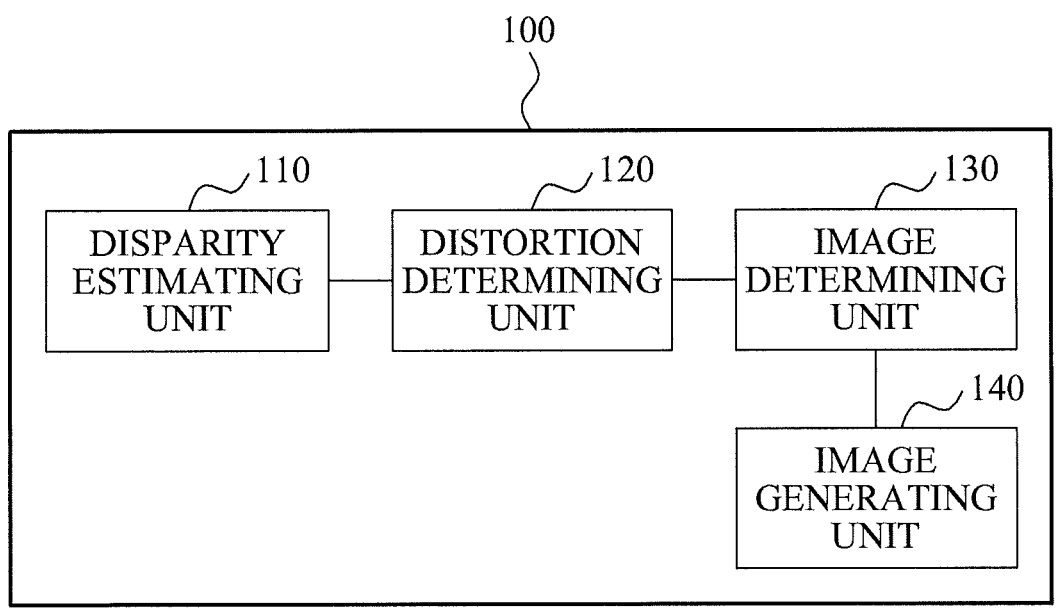
FIG. 1 illustrates an apparatus for processing an image, according to example embodiments.

Reference will now be made in detail to embodiments, examples of which are illustrated in the accompanying drawings, wherein like reference numerals refer to the like elements throughout. Embodiments are described below to explain the present disclosure by referring to the figures.

A view may represent information or an image of an object captured at a predetermined viewpoint. As used herein, an "image" may refer to a "view", for example, the terms "image" and "view" may be used interchangeably.

The view may include an image and disparity information about the image. The view may also include an image and depth information about the image. The disparity information about the image may include respective disparities of a plurality of pixels in the image. The depth information may include respective depths of a plurality of pixels in the image. The respective disparities and the respective depths may be inversely proportional to one another. As used herein, "disparity" may be used interchangeably with "depth".

An object may be captured at a plurality of viewpoints. A multi-view may refer to a plurality of views at the plurality of viewpoints.

"View of an image" may refer to a "view including an image". "Information about a disparity of an image" may refer to disparity information about the image. For example, the view may include an image and disparity information about the image.

Estimating a disparity of an image may include generating disparity information about an image. Estimating a disparity of an image may include calculating or determining a disparity for a plurality of pixels of the image.

Estimating a disparity of a line of an image may include generating disparity information about the line. Estimating the disparity of the line may include calculating or determining a disparity for a plurality of pixels of the line.

FIG. 1 illustrates an apparatus 100 for processing an image, according to example embodiments.

The apparatus 100 for processing the image may include a distortion determining unit 120, an image determining unit 130, and an image generating unit 140. The apparatus 100 for processing the image may further include a disparity estimating unit 110. At least one of the above-described units may include one or more processing devices.

The apparatus 100 for processing the image may generate and output a multi-view image based on at least one of a first image and a second image. The first image and the second image may be one image and another image, respectively, among stereo images. For example, the first image and the second image may be a left image and a right image, respectively. The stereo images may refer to images failing to be calibrated with one another. That is, a distortion may exist between the stereo images.

The multi-view image may generate an image for an autostereoscopic three-dimensional (3D) display. The multi-view image may be an image at a virtual predetermined viewpoint.

The first image, the second image, and an output image may be an image of a view with respect to a scene. The first image, the second image, and the output image may be respective images of a view at a predetermined viewpoint with respect to a scene. For example, the first image may be an image of a first view, and the second image may be an image of a second view.

The apparatus 100 for processing the image may generate and output images at multiple predetermined viewpoints using a limited number of images. The apparatus 100 for processing the image may provide a wide viewing angle for a 3D television. The apparatus 100 for processing the image may represent a 3D image at a viewpoint to be viewed from a viewer.

Hereinafter, a multi-view image generated by the apparatus 100 for processing the image may refer to a third image. For example, the third image may be an image generated and outputted by the apparatus 100 for processing the image.

A view of the first image, a view of the second image, and a view of the third image may be a view when a plurality of objects is captured at differing viewpoints. For example, a viewpoint of the view of the first image, a viewpoint of the view of the second image, and a viewpoint of the view of the third image may differ from one another. That is, the viewpoint of the third image may differ from the viewpoint of the first image and the viewpoint of the second image. In particular, the apparatus 100 for processing the image may generate the third image at a viewpoint differing from the viewpoint of the first image and the view point of the second image. Further, depending on embodiments, the third image may be a plurality of images.

Hereinafter, the disparity estimating unit 110, the distortion determining unit 120, the image determining unit 130, and the image generating unit 140 will be described in detail with reference to FIGS. 2 to 9.

Figure 2:
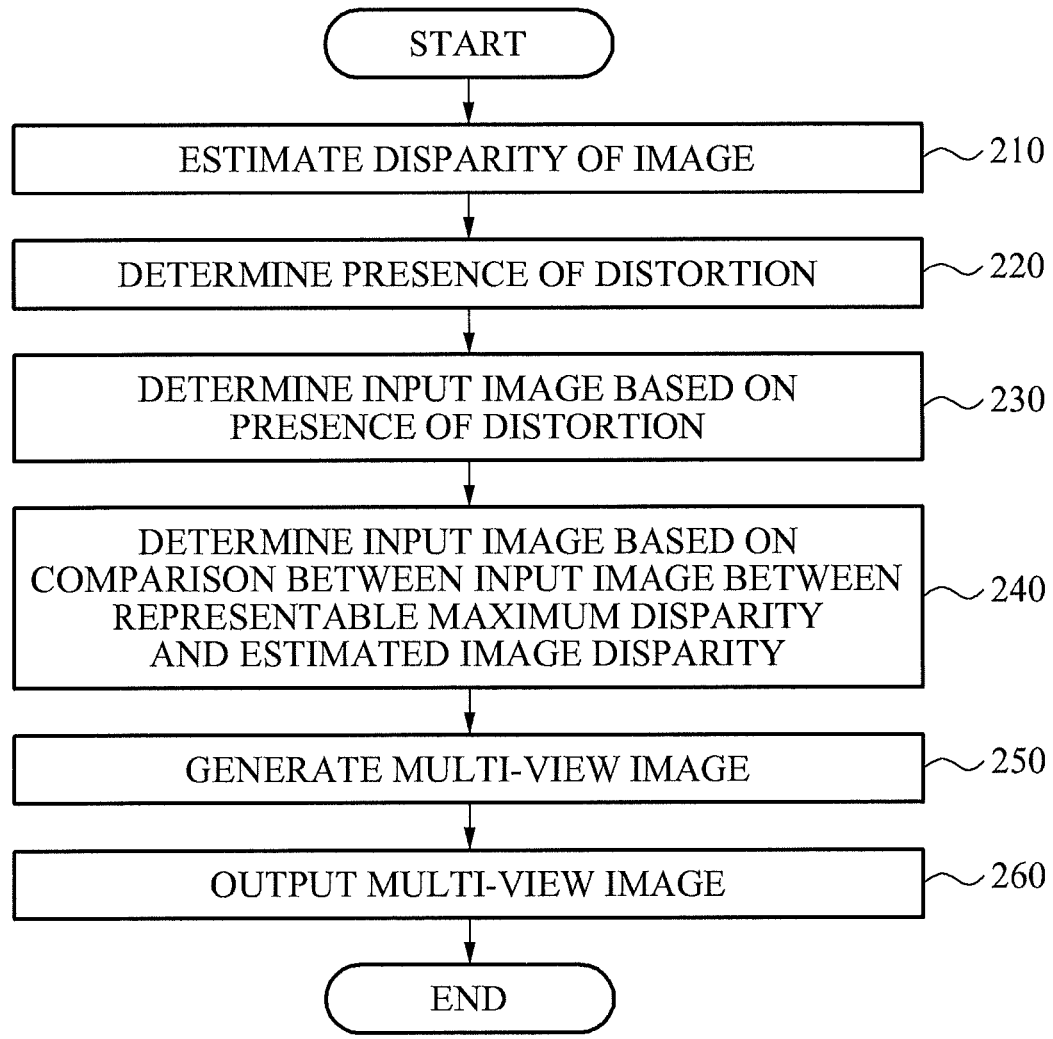
FIG. 2 illustrates a method for processing an image, according to example embodiments.

FIG. 2 is a flowchart illustrating a method for processing an image, according to example embodiments.

In operation 210, the disparity estimating unit 110 may estimate a disparity of a first image and a disparity of a second image. The disparity of the first image may include a disparity corresponding to a pixel of the first image. A color value of the pixel may represent a color at a position corresponding to the pixel. The disparity corresponding to the pixel may represent a disparity at the position corresponding to the pixel.

Hereinafter, an example of a process in which the disparity estimating unit 110 estimates a disparity will be described in detail with reference to FIG. 3.

In operation 220, the distortion determining unit 120 may determine a presence of a distortion between a plurality of images, for example, the first image and the second image.

In operation 230, the image determining unit 130 may determine at least one of the first image and the second image to be an image to be used for generating a third image based on the presence of the distortion. When the distortion between the first image and the second image is determined to be present, and a total of the first image and the second image is used for generating the third image, erroneous data may exist in the third image because of a discrepancy between the first image and the second image. Accordingly, when the distortion between the first image and the second image is determined to be present, the third image may be generated using only a single image from the first image and the second image. Conversely, when the distortion between the first image and the second image is determined to be absent, the third image may be generated using the total of the first image and the second image.

Further, as an example, the distortion may be at least one of a color distortion and a geometric distortion between the first image and the second image, however, the present disclosure is not limited thereto.

For example, the image determining unit 130 may determine one of the first image and the second image to be an image to be used for generating the third image when the distortion is present. When the distortion is absent, operation 240 may be performed.

The distortion may be represented numerically. The image determining unit 130 may determine at least one of the first image and the second image to be an image to be used for generating the third image based on a degree of distortion. Hereinafter, the at least one image determined to be the image to be used for generating the third image may be referred to as an input image.

The image determining unit 130 may determine one of the first image and the second image to be the input image when the degree of distortion is greater than a predetermined reference value. When the degree of distortion is less than the predetermined reference value, operation 240 may be performed.

In operation 240, the image determining unit 130 may determine at least one of the first image and the second image to be the input image based on a comparison between the disparity of the first image, the disparity of the second image estimated in operation 210, and a maximum disparity representable by the apparatus 100 for processing the image.

For example, the image determining unit 130 may determine one of the first image and the second image to be the input image when a maximum disparity from among the estimated disparity of the first image and the estimated disparity of the second image is greater than the maximum disparity representable by the apparatus 100 for processing the image. Hereinafter, the maximum disparity representable by the apparatus 100 for processing the image may be referred to as a "representable maximum disparity". The image determining unit 130 may determine the total of the first image and the second image to be the input image when the maximum disparity from among the estimated disparity of the first image and the estimated disparity of the second image is less than the representable maximum disparity. As an alternative to the method shown in FIG. 2, operations 230 and 240 may be performed selectively. For example, the image to be used for generating the third image may be determined in operation 230 or operation 240, depending on embodiments.

For example, when only operation 230 is performed, the image determining unit 130 may determine one of the first image and the second image to be the input image when the distortion is present, and when the distortion is absent, the total of the first image and the second image may be determined to be the input image.

Alternatively, when only operation 230 is performed, the image determining unit 130 may determine one of the first image and the second image to be the input image when the degree of distortion is greater than the predetermined reference value, and when the degree of distortion is less than the predetermined reference value, the total of the first image and the second image may be determined to be the input image.

For example, when only operation 240 is performed, the image determining unit 130 may determine one of the first image and the second image to be the input image when the maximum disparity from among the estimated disparity of the first image and the estimated disparity of the second image is greater than the representable maximum disparity. The image determining unit 130 may determine the total of the first image and the second image to be the input image when the maximum disparity from among the estimated disparity of the first image and the estimated disparity of the second image is less than the representable maximum disparity.

In operation 250, the image generating unit 140 may generate the third image using the determined input image, as discussed above.

When one of the first image and the second image is determined to be the input image, the image generating unit 140 may perform single view rendering using a single image determined to be the input image. In this case, the third image may be generated by performing the single view rendering, for example.

When the total of the first image and the second image is determined to be the input image, the image generating unit 140 may perform stereo view rendering using the two images determined to be the input image. In this case, the third image may be generated by performing the stereo view rendering, for example.

In operation 260, the image generating unit 140 may output the generated third image.

Figure 3:
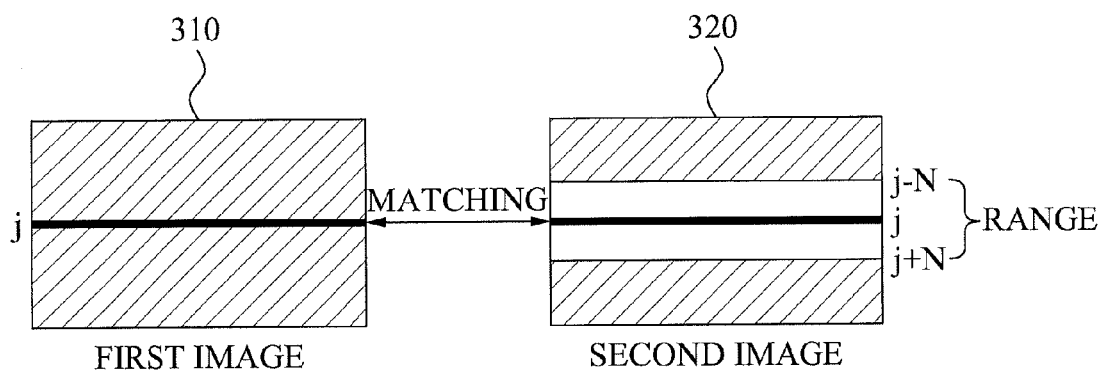
FIG. 3 illustrates a method for estimating a disparity between images, according to example embodiments.

FIG. 3 illustrates a method for estimating a disparity between images, according to example embodiments.

In estimating a disparity of stereo images, in general, it may be assumed that a left image and a right image are on an identical epipolar line. When a first image 310 and a second image 320 are on the identical epipolar line, the disparity estimating unit 110 may estimate a disparity of a first line and a disparity of a second line through matching the first line of the first image 310 with the second line of the second image 320. The first line may be a line parallel to the first image 310. The second line may be a line parallel to the second image 320. As an example, the first line and the second line may be horizontal lines of pixels, however, the present disclosure is not limited thereto. The matched first line of the first image 310 and the second line of the second image 320 may be corresponding lines.

The corresponding lines may have an identical y-coordinate. For example, a y-coordinate of the first line may be identical to a y-coordinate of the second line. In FIG. 3, the first line is illustrated to be a j-th line of the first image 310, and the second line is illustrated to be a j-th line of the second image 320.

The disparity estimating unit 110 may match the first line and the second line to estimate a disparity of the first line and a disparity of the second line.

The matching of the lines may be performed by detecting pixels indicating an identical point from among pixels on the first line and pixels on the second line. A first pixel on the first line and a second pixel on the second line may be matched to be pixels indicating an identical point. In this instance, for example, the first pixel and the second pixel may indicate an identical physical point in a captured object.

The disparity estimating unit 110 may estimate a disparity based on the matched pixels. For example, the disparity estimating unit 110 may calculate a disparity based on a difference of an x-coordinate between the matched pixels. The smaller the difference of the x-coordinates between the matched pixels, the greater a distance from a viewpoint of a point corresponding to the pixels. For example, the disparity of a plurality of pixels may have a smaller value as the difference of the x-coordinate between the matched pixels decreases.

The matching between the lines may not be performed fully due to various reasons. For example, a total of the pixels of the first line and the pixels of the second line may not be matched on a one to one basis. The various reasons may include an occlusion in an image, a difference between viewpoints of images, a difference between objects represented by images, a difference between points represented by lines, noise, and the like.

A matching error may refer to an error in matching lines. The matching error may refer to a degree to which complete matching is not performed in the matching of the lines. For example, the greater a number of unmatched pixels among pixels of the lines, the greater a value of the matching error.

When a geometric distortion between the first image 310 and the second image 320 is present, a line of the second image 320 corresponding to a j-th line of the first image 310 may not be a j-th line of the second image 320. Accordingly, lines in a predetermined range from among lines of the second image 320 may be examined to detect a line of the second image 320 actually corresponding to the j-th line of the first image 310. For example, the second line of the second image 320 may be plural, i.e., there may be a plurality of second lines.

A plurality of second lines may be lines in a predetermined range. For example, a y-coordinate of the plurality of second lines may be in a predetermined range centered around a y-coordinate of the first line. In FIG. 3, the y-coordinate of the first line may be j. A y-coordinate of the plurality of second lines may be greater than j−N and less than j+N. Here, N may be an integer greater than "0".

In operation 210, described with reference to FIG. 2, the disparity estimating unit 110 may estimate the respective disparity of the first line and the respective disparity of the plurality of second lines with respect to the first line of the first image 310 and the plurality of second lines of the second image 320. The disparity estimating unit 110 may estimate the respective disparity of the first line and the respective disparity of the plurality of second lines by performing matching with respect to the first line and the plurality of second lines. The disparity estimating unit 110 may calculate a value of a matching error between the respective disparity of the first line and the respective disparity of the plurality of second lines by performing the matching with respect to the first line and each of the plurality of second lines. The disparity estimating unit 110 may calculate the value of the matching error with the first line with respect to the plurality of second lines.

In operation 220 described with reference to FIG. 2, the distortion determining unit 120 may determine a distortion to be present when the y-coordinate of the first line differs from a y-coordinate of a line matched to the first line from among the plurality of second lines. The line matched to the first line may be a line having a minimum value of the matching error with the first line from among the plurality of second lines.

When a geometric distortion between the first image and the second image is present, a line of the second image corresponding to a j-th line of the first image may not be a j-th line of the second image. In particular, when y-coordinates of the corresponding lines differ from one another, such a difference may result from the geometric distortion between the images. When the geometric distortion between the first image and the second image is present, the disparity estimating unit 110 may not detect matching between pixels among which the matching error is minimized with respect to the j-th line of the first image and the j-th line of the second image. That is, the j-th line of the second image may not correspond to the line of the second image in which the matching error is at a minimum. Accordingly, a plurality of lines in a predetermined range may be required to be matched to the j-th line of the first image, aside from the j-th line of the second image, in order to determine the presence of the geometric distortion, e.g., to determine the line in which the matching error is minimized.

A line corresponding to the first line of the plurality of second lines may be a line of which a value of the matching error with the first line is a minimum. When a y-coordinate of the line corresponding to the first line of the plurality of second lines differs from a y-coordinate of the first line, the geometric distortion may be determined to be present between the first image and the second image.

The distortion determining unit 120 may detect a line of the second image optimally matched to a plurality of lines of the first image. The line of the second image optimally matched to the line of the first image may be a line of the second image in a predetermined range of which the value of matching error with the line of the first image is a minimum.

A portion of the lines of the first image may have a y-coordinate differing from the y-coordinate of the line of the second image to which the y-coordinate of the lines of the first image is optimally matched. The distortion determining unit 120 may determine the presence of the geometric distortion based on a ratio of lines having a y-coordinate differing from the y-coordinate of the line of the second image optimally matched to one of the lines of the first image. The distortion determining unit 120 may determine the geometric distortion to be present when the ratio is greater than a predetermined reference value.

The disparity estimating unit 110 may use general matching processes to perform matching between images, lines, and pixels, respectively.

Figure 4:
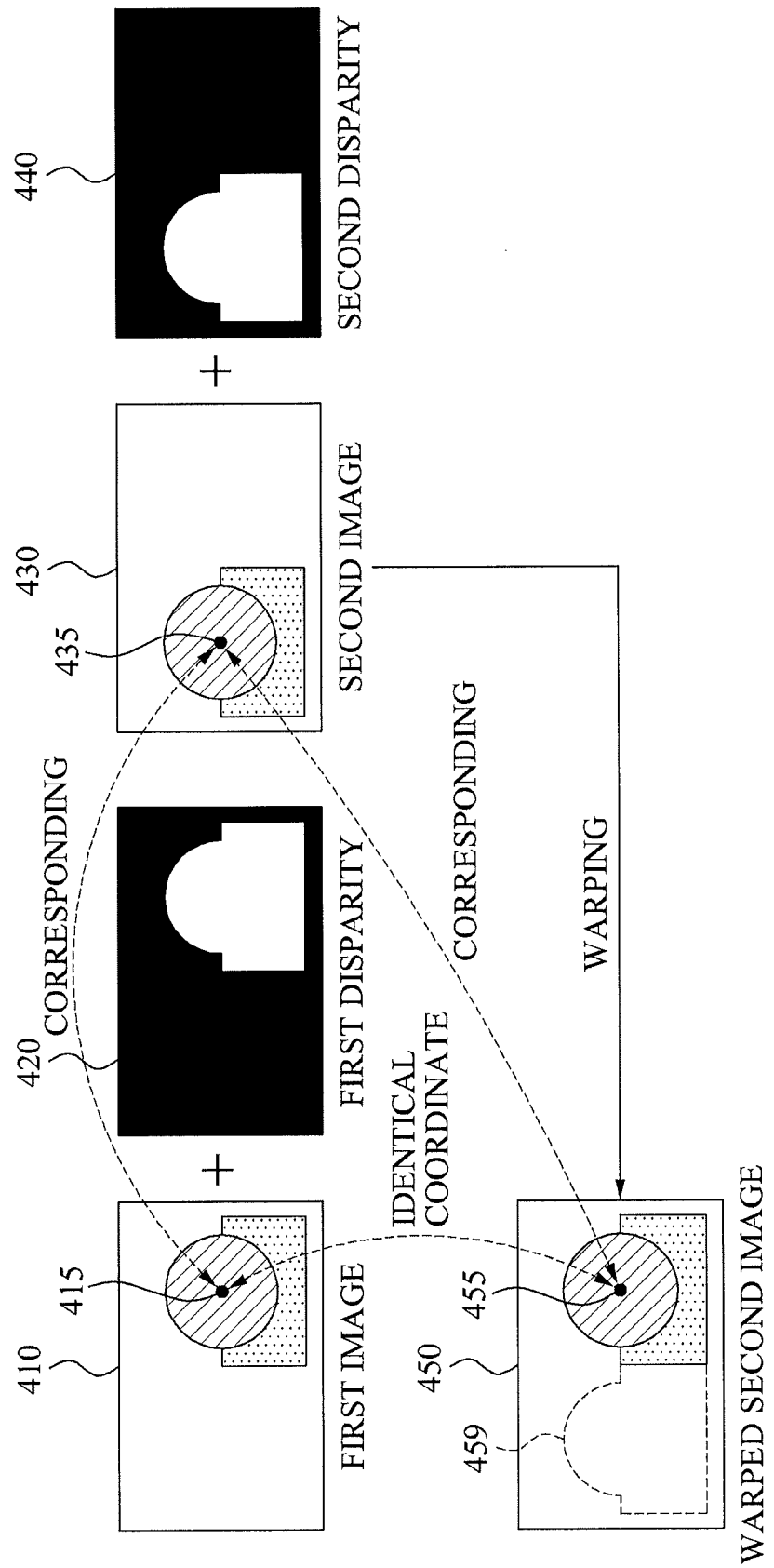
FIG. 4 illustrates a method for determining a presence of a color distortion, according to example embodiments.

FIG. 4 illustrates a method for determining a presence of a color distortion, according to example embodiments.

Referring to FIG. 4, a first image 410, a first disparity 420 of the first image 410, a second image 430, a second disparity 440 of the second image 430 are illustrated.

Patterns of the first image 410 and the second image 430 may represent a color of a pixel. A contrast of the first disparity 420 and the second disparity 440 may represent a disparity of the pixel. A darker contrast may have a lower value of disparity. For example, a black portion in the first disparity 420 and the second disparity 440 may represent a background, and a white portion may represent a foreground.

The second image 430 may be warped to a viewpoint of the first image 410. In FIG. 4, the second image 450 being warped to a viewpoint of the first image 410 is illustrated.

In operation 220, described above with reference to FIG. 2, the distortion determining unit 120 may generate the warped second image 450 by warping the second image 430 to a viewpoint of the first image 410. Due to the warping, hole area 459 may be present in the warped second image 450.

The distortion determining unit 120 may use the second disparity 440 to warp the second image 430. The distortion determining unit 120 may use general warping processes to warp the second image 430.

The distortion determining unit 120 may determine the presence of the distortion based on a difference between a color of a first pixel of the first image 410 and a color of a second pixel of the second image 430. As an example, the first pixel may correspond to the second pixel.

The pixels corresponding to one another, e.g., the first pixel and the second pixel, may be pixels indicating an identical point of an object. When the second image 430 is warped to a viewpoint of the first image 410, the pixels corresponding to one another may be pixels having identical coordinates from among pixels of the warped second image 450 and pixels of the first image 410.

In FIG. 4, a first pixel 415 and a second pixel 435 may represent an identical point of an object. When the second image 430 is warped to the viewpoint of the first image 410, the second pixel 435 may correspond to a third pixel 455 in the warped second image 450. In FIG. 4, a coordinate of the first pixel 415 in the first image 410 may be identical to a coordinate of the third pixel 455 in the warped second image 450. Accordingly, the first pixel 415 and the second pixel 435 may be pixels corresponding to one another.

The distortion determining unit 120 may determine a color distortion to be present when a difference of colors between the corresponding pixels is greater than a predetermined reference value.

The difference of colors may be calculated by a total of corresponding pixels in the images as well as each of the corresponding pixels.

The distortion determining unit 120 may calculate the difference of colors with respect to the corresponding pixels in the first image 410 and the second image 430. The distortion determining unit 120 may calculate a sum or an average of differences of colors for a plurality of corresponding pixels in the first image 410 and the second image 430. When the sum or the average of the calculated differences is greater than a predetermined reference value, the distortion determining unit 120 may determine the color distortion to be present.

The distortion determining unit 120 may determine the presence of the color distortion based on Equation 1, shown below.

$$E = \sum_{j=0}^{height} \sum_{i=0}^{width} \frac{|I_L(i, j) - I_R(i - d_{i,j}, j)|}{M}$$

Here, E denotes an average of differences of colors for a plurality of corresponding pixels in the first image 410 and the second image 430. M denotes a number of pixels rather than or other than holes from among pixels of the warped second image 450. $I_L(i, j)$ denotes a color value of a pixel of which a coordinate of the first image 410 is (i, j) when the first image 410 is a left image. $I_R(i-d_{i,j}, j)$ may be a color value of a pixel of which a coordinate of the second image 430 is (i-$d_{i,j}$, j) when the second image 430 is a right image. $d_{i,j}$ denotes a disparity of a pixel of which a coordinate of the second image 430 is (i, j). A pixel of which a coordinate of the warped second image 450 is (i, j) may correspond to a pixel of which a coordinate of the second image 430 is (i-$d_{i,j}$, j). In particular, a pixel of which a coordinate of the first image 410 is (i, j), a pixel of which a coordinate of the second image 430 is (i-$d_{i,j}$, j), and a pixel of which a coordinate of the warped second image 450 is (i, j) may be pixels corresponding to one another.

$|I_L(i,j)-I_R(i-d_{i,j},j)|$ may refer to a difference between color values of the corresponding pixels of the first image 410 and the second image 430, or an absolute value of the difference. height may be a maximum value of the y-coordinate of the first image 410 or the second image 430. width may be a maximum value of the x-coordinate of the first image 410 and the second image 430.

Due to structural restrictions of the apparatus 100 for processing the image, a representable range of depth or disparity may be limited. A range of a view or an image to be generated by the apparatus for processing the image 100 without an image quality degradation issue may be limited by restrictions of a method for generating a view of a multi-view or an image. Accordingly, when the multi-view image is generated using stereo images, the apparatus for processing the image 100 may generate the multi-view image based on a range of a disparity of the stereo images, a range of a disparity representable by the apparatus 100 for processing the image, and a range of a disparity able to be covered by the process for generating the multi-view image.

Hereinafter, the range of the disparity representable by the apparatus 100 for processing the image will be referred to as a "representable disparity range". A range of a disparity of an input image will be referred to as an "input image disparity range". The input image disparity range may be a sum of a range of a disparity of a first image and a range of a disparity of a second image.

A third image may be plural, i.e., there may be more than one third image. In operation 250, described with reference to FIG. 2, the image generating unit 140 may generate a plurality of third images using an input image.

The apparatus 100 for processing the image may adjust a number of images generated by interpolation and a number of images generated by extrapolation to generate the plurality of third images having an optimal depth or disparity using stereo view rendering. The apparatus 100 for processing the image may adjust a depth or a disparity of an input image to generate the plurality of third images having the optimal depth or disparity using singular view rendering, for example.

Figure 5:
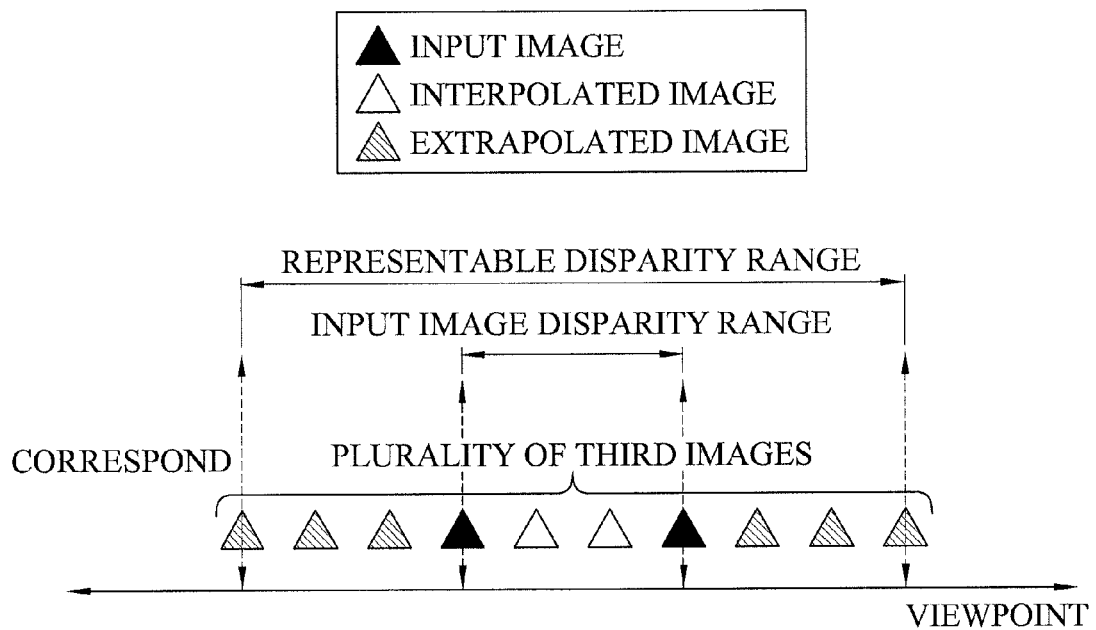
FIG. 5 illustrates a method for generating a multi-view image using interpolation and extrapolation, according to example embodiments.

Hereinafter, referring to FIGS. 5 to 8, a process for generating a plurality of third images will be described based on a comparison of a representable disparity range to an input image disparity range. In FIGS. 5 to 8, a number of the plurality of third images is illustrated to be "10" as shown by the 10 triangles in FIG. 5. The number of the third images shown in FIG. 5 is an example, and thus, the present disclosure is not limited thereto. In FIGS. 5 to 8, an input image, an interpolated image, and an extrapolated image are distinguished by a plurality of patterns.

FIG. 5 illustrates a method for generating a multi-view image using interpolation and extrapolation, according to example embodiments.

In operations 230 and 240, with reference to FIG. 2, the image determining unit 130 may determine a total of the first image and the second image to be an input image.

Hereinafter, operation of the image generating unit 140 will be described when the representable disparity range exceeds the input image disparity range.

In operation 250, described with reference to FIG. 2, the image generating unit 140 may generate a plurality of third images using an input image. A plurality of viewpoints for the plurality of third images generated may be within a range of a viewpoint corresponding to the representable disparity range. For example, intervals between viewpoints adjacent to viewpoints of the plurality of third images may be equal to one another.

A portion of the plurality of third images may be the input image. The input image may refer to a first image and a second image. The plurality of third images generated by the image generating unit 140 may include the first image and the second image.

The image generating unit 140 may generate at least one fourth image by applying interpolation to the first image and the second image. The at least one fourth image may be an image disposed between the first image and the second image based on a viewpoint of the plurality of third images. The at least one fourth image may be an interpolated image generated by interpolation. Intervals between adjacent images among the input images and fourth images may be equal to one another.

The image generating unit 140 may generate at least one fifth image by applying extrapolation to the first image or the second image. The at least one fifth image may be an image disposed outside the first image and outside the second image based on a viewpoint among the plurality of third images. The at least one fifth image may be an extrapolated image generated by extrapolation. Intervals between adjacent images from among the first image and fifth images outside the first image may be equal to one another. Intervals between adjacent images from among the second image and fifth images outside the second image may be equal to one another.

In FIG. 5, one of the plurality of third images is illustrated to be generated with respect to viewpoints corresponding to both ends of the representable disparity range. A viewpoint of the third image may be adjusted based on a range of a disparity of the third image to be generated. For example, images disposed at both ends of the plurality of third images may be moved to a viewpoint further inside than a viewpoint corresponding to an end of the representable disparity range, in proportion to a range of a disparity of an image. The aforementioned range of the disparity, adjusting the viewpoint of the image, moving the viewpoint, and the like, may be applied to other images among the plurality of third images.

Figure 6:
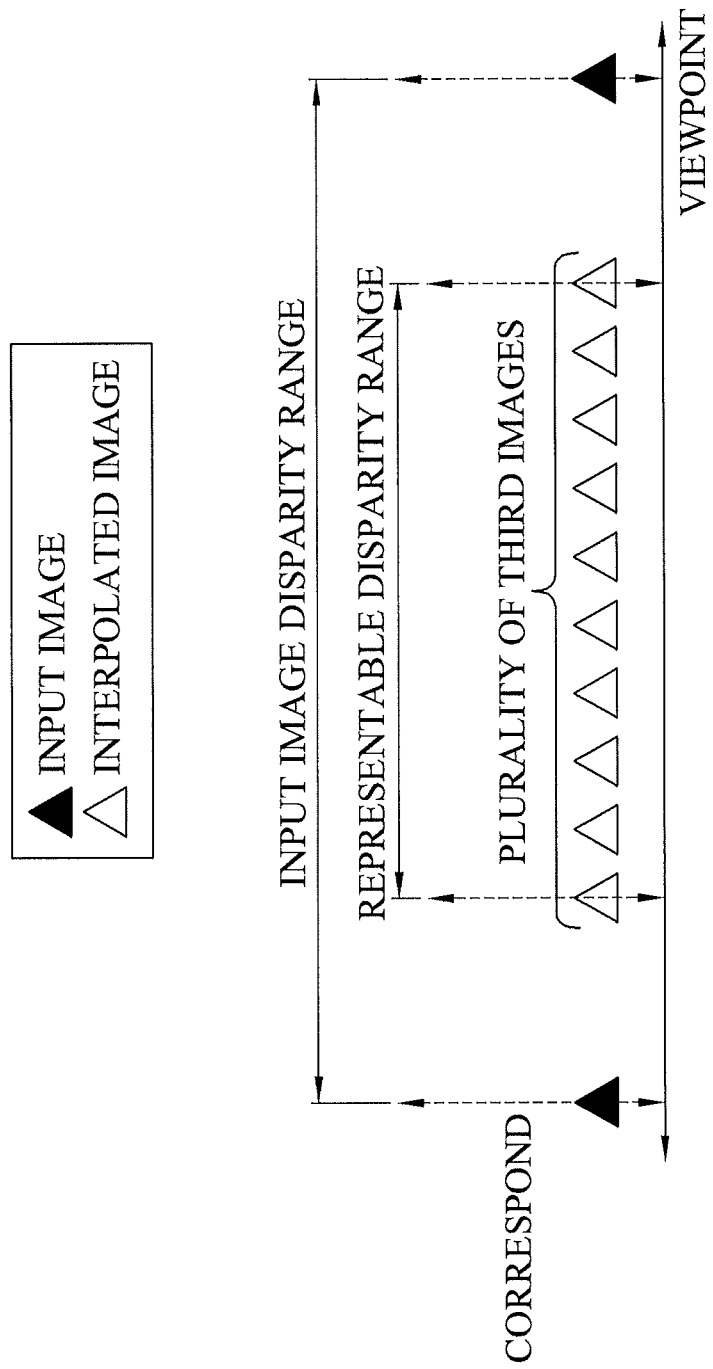
FIG. 6 illustrates a method for generating a multi-view image using interpolation, according to example embodiments.

FIG. 6 illustrates a method for generating a multi-view image using interpolation, according to example embodiments.

In operations 230 and 240, described with reference to FIG. 2, the image determining unit 130 may determine the first image and a second image to be input images.

Hereinafter, operation of the image generating unit 140 will be described when an input image disparity range exceeds the representable disparity range.

In operation 250, described with reference to FIG. 2, the image generating unit 140 may generate a plurality of third images using an input image. The first image and the second image may fail to be outputted by the apparatus 100 for processing the image as per usual because the input image disparity range exceeds the representable disparity range. Accordingly, the image generating unit 140 may generate a total of the plurality of third images in a range of a viewpoint corresponding to the representable disparity range. The viewpoint of the plurality of third images generated may be in a range of a viewpoint corresponding to the representable disparity range. For example, intervals between adjacent viewpoints from among viewpoints of the plurality of third images may be equal to one another.

In this case, for example, the plurality of third images may not include an input image. The image generating unit 140 may generate the plurality of third images by applying interpolation to the first image and the second image. The plurality of third images may be an interpolated image generated by interpolation. Intervals between adjacent images from among the plurality of third images may be equal to one another.

Figure 7:
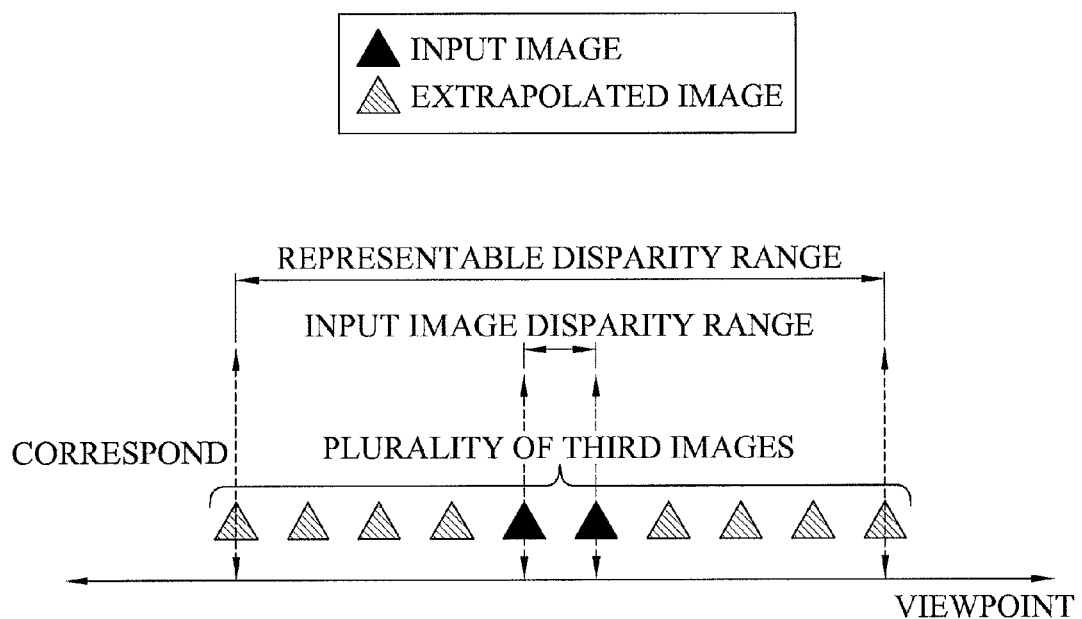
FIG. 7 illustrates a method for generating a multi-view image using extrapolation, according to example embodiments.

FIG. 7 illustrates a method for generating a multi-view image using extrapolation, according to example embodiments.

In operations 230 and 240, described with reference to FIG. 2, the image determining unit 130 may determine a total of the first image and the second image to be an input image.

Hereinafter, operation of the image generating unit 140 will be described when a representable disparity range exceeds an input image disparity range, and a difference of viewpoints of input images is less than a difference of viewpoints of adjacent images from among a plurality of third images to be generated.

In operation 250, described with reference to FIG. 2, the image generating unit 140 may generate the plurality of third images using an input image. Viewpoints of the plurality of third images generated may be in a range of a viewpoint corresponding to the representable disparity range. For example, intervals between adjacent viewpoints from among the plurality of third images may be equal to one another.

A portion of the plurality of third images may be an input image. The input image may be a first image and a second image. The plurality of third images generated by the image generating unit 140 may include the first image and the second image.

The difference of viewpoints of the input images may be less than a difference of viewpoints of adjacent images from among the plurality of third images to be generated by the image generating unit 140. In particular, generating a third image by interpolation between the input images may not be required because an interval of viewpoints of the input images is sufficiently narrow.

The image generating unit 140 may generate at least one sixth image by applying extrapolation to the first image and the second image. The at least one sixth image may be an image disposed outside the first image or outside the second image based on a viewpoint among the plurality of third images. The at least one sixth image may be an extrapolated image generated by extrapolation. Intervals between the first image and adjacent images from among the sixth images outside the first image may be equal to one another. Intervals between the second image and adjacent images from among the sixth images outside the second image may be equal to one another.

In the examples described with reference to FIGS. 5 to 7, the image generating unit 140 may generate a plurality of third images based on Equation 2.

The image generating unit 140 may determine a number of interpolated images from among the plurality of third images based on Equation 2, shown below.

$$\frac{D_{max}}{(D_{target}/M)} - 1 \quad \text{[Equation 2]}$$

$D_{target}$ denotes a maximum value of the representable disparity range. M denotes a number of the plurality of third images. $D_{target}/M$ denotes an interval between the plurality of third images. $D_{max}$ denotes a maximum disparity of the input image. $D_{max}$ may be less than $D_{target}$.

When $D_{max}$ is less than $D_{target}$, the image generating 140 may determine a value obtained by subtracting a number of interpolated images and a number of input images from M to be a number of extrapolated images from among the plurality of third images.

When $D_{max}$ is greater than $D_{target}$, the image generating 140 may generate only interpolated images.

Figure 8:
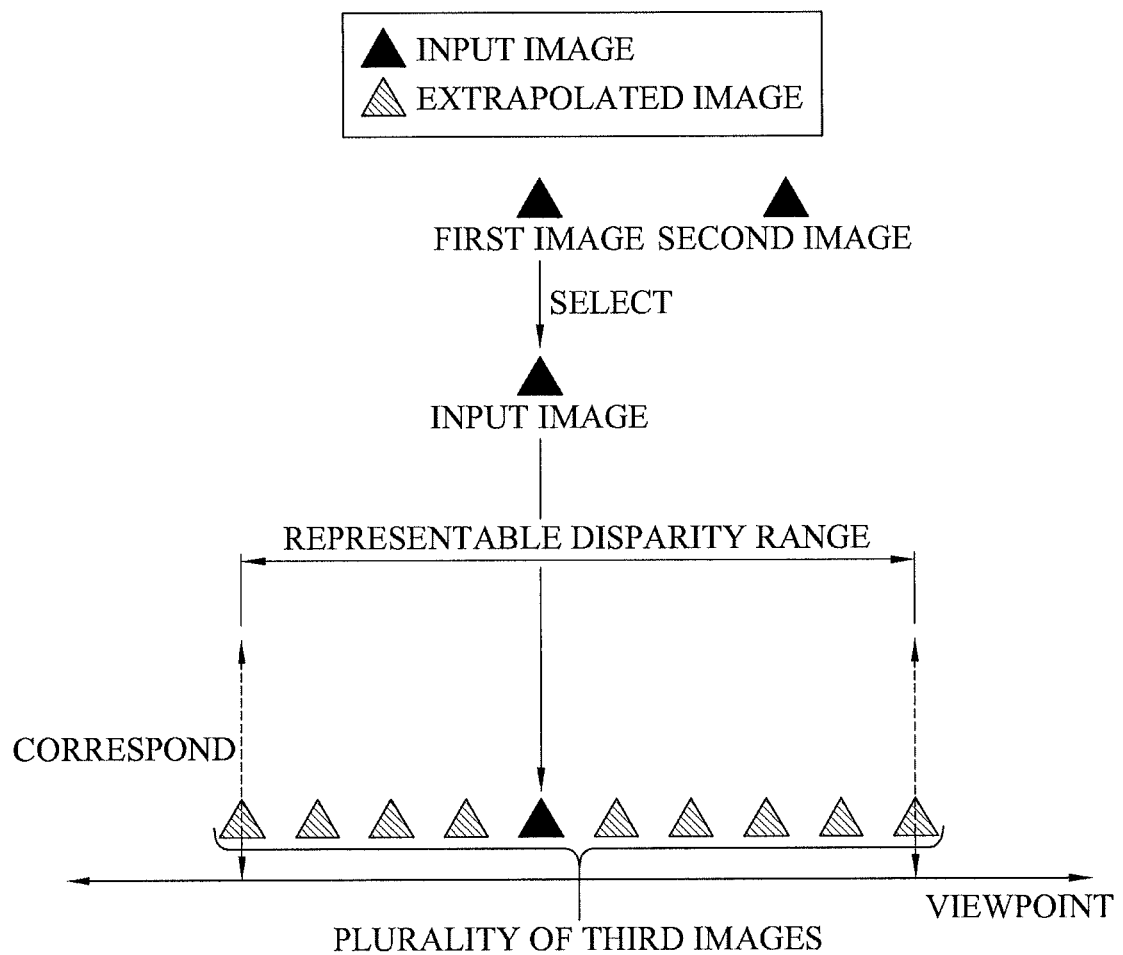
FIG. 8 illustrates a method for generating a multi-view image using extrapolation, according to example embodiments.

FIG. 8 illustrates a method for generating a multi-view image using extrapolation, according to example embodiments.

In operations 230 and 240, described with reference to FIG. 2, the image determining unit 130 may determine at least one of a first image and a second image to be an input image.

Hereinafter, operation of the image generating unit 140 will be described when a representable disparity range exceeds an input image disparity range.

In operation 250, described with reference to FIG. 2, the image generating unit 140 may generate a plurality of third images using an input image. Viewpoints of the plurality of third images generated may be in a range of a viewpoint corresponding to the representable disparity range. For example, intervals between adjacent viewpoints from among viewpoints of the plurality of third images may be equal to one another.

A portion of the plurality of third images may be an input image. The input image may be the first image or the second image. The plurality of third images generated by the image generating unit 140 may include the first image or the second image. In FIG. 8, the input image is illustrated to be the first image disposed on a left side.

The image generating unit 140 may generate at least one seventh image by applying extrapolation to the first image or the second image. The at least one seventh image may be images, aside from the input image from among the plurality of third images. The at least one seventh image may be disposed on a left or right side of the input image based on a viewpoint. For example, images may be generated up to viewpoints corresponding to both ends of a representable maximum disparity range, to a left and right direction of the input image. The at least one seventh image may be an extrapolated image generated by extrapolation. Images disposed on the left side of the input image from among the at least one seventh image may be disposed at regular intervals. Images disposed on the right side of the input image from among the at least one seventh image may be disposed at regular intervals.

The image generating unit 140 may generate the plurality of third images by re-scaling a disparity of the input image based on Equation 3.

$$d_{i,j}^{rescale} = d_{i,j}^{input} \times \frac{D_{target}}{D_{max}} \quad \text{[Equation 3]}$$

$d_{i,j}^{input}$ denotes a disparity of a pixel of which a coordinate of an input image is (i,j). $d_{i,j}^{rescale}$ denotes a disparity of a pixel of which a coordinate of a re-scaled image is (i, j). The re-scaled image may be a far left image or a far right image from among the plurality of third images. The image generating unit 140 may determine a disparity of a pixel of the far left image or the far right image. The image generating unit 140 may generate a disparity of the re-scaled image by determining a disparity of a plurality of pixels of the re-scaled image. The image generating unit 140 may generate a disparity of the plurality of third images based on a disparity of the far left image and a disparity of the far right image.

Figure 9:
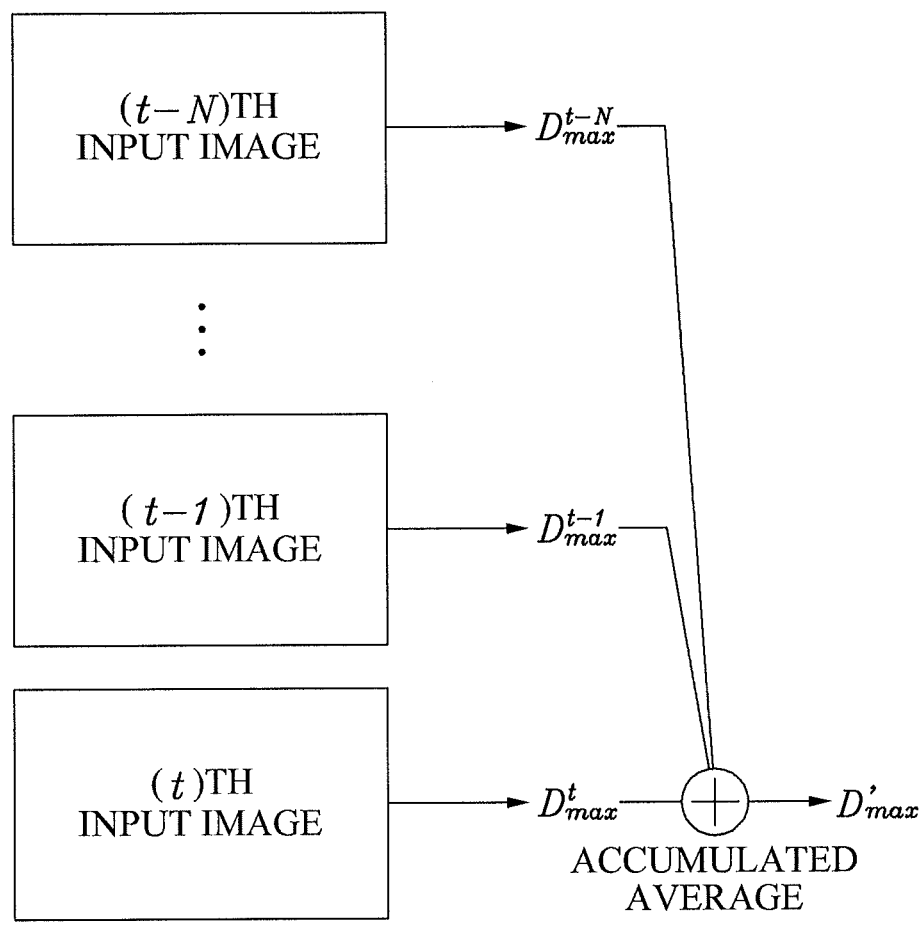
FIG. 9 illustrates a method for calculating a range of a disparity of an input image, according to example embodiments.

FIG. 9 illustrates a method for calculating a range of a disparity of an input image, according to example embodiments.

The apparatus 100 for processing the image may generate a plurality of third images per hour, as time elapses. For example, a first image and a second image may be an image at a predetermined viewpoint from among a successive plurality of images.

When the image determining unit 130 calculates $D_{max}$, a maximum disparity of an input image, independently per hour, $D_{max}$ may continually change on an hourly basis. For example, $D_{max}$ may change for a plurality of frames. Here, a viewpoint for a plurality of third images may continue changing to a great extent when $D_{max}$ changes. As the view point changes to a great extent, flickering may occur between chronologically successive images outputted by the apparatus 100 for processing the image.

The image determining unit 130 may determine an input image disparity range based on input image disparity ranges calculated at a plurality of viewpoints. For example, the image determining unit 130 may calculate a current input image disparity range using the input image disparity range for at least one previous viewpoint.

The image determining unit 130 may determine a current Dmax based on the Dmax calculated at the plurality of viewpoints. For example, the image determining unit 130 may calculate a current Dmax using Dmax for at least one previous viewpoint. Here, the current Dmax may refer to Dmax to be used for generating a plurality of third images.

The image determining unit 130 may calculate the current Dmax based on Equation 4.

$$D'_{max} = \frac{\sum_{i=0}^{N} \alpha_{t-i} \cdot D_{max}^{t-i}}{\sum_{i=0}^{N} \alpha_{t-i}} \quad \text{[Equation 4]}$$

$D'_{max}$ denotes a current $D_{max}$ with respect to a current input image to be used for generating the plurality of third images. $D_{max}^{t-i}$ denotes $D_{max}$ at a viewpoint t-i. $\alpha_{t-i}$ denotes a weight value with respect to a viewpoint t-i. N denotes a number of $D_{max}$ at previous viewpoints to be used for calculating $D_{max}^{t}$. N may be an integer greater than "1". $\alpha_{t-i}$ may be a real number greater than "0".

The image determining unit 130 may determine a weighted-sum to which a weight value of $D_{max}$ of an input image and a weight value of $D_{max}$ calculated for the at least one previous viewpoint are applied to be $D_{max}$ for generating the plurality of third images. The image determining unit 130 may use an accumulated average value of the $D_{max}$ calculated at successive viewpoints as $D_{max}$ at a current viewpoint.

According to the aforementioned example embodiments, a multi-view image may be generated. The example embodiments may be used for an autostereoscopic 3D display providing a wide viewing angle. The example embodiments may be used for a free viewpoint display. A viewer may observe an image at a virtual predetermined viewpoint while freely moving through the free viewpoint display.

A portable device as used throughout the present specification includes mobile communication devices, such as a personal digital cellular (PDC) phone, a personal communication service (PCS) phone, a personal handy-phone system (PHS) phone, a Code Division Multiple Access (CDMA)-2000 (1×, 3×) phone, a Wideband CDMA phone, a dual band/dual mode phone, a Global System for Mobile Communications (GSM) phone, a mobile broadband system (MBS) phone, a satellite/terrestrial Digital Multimedia Broadcasting (DMB) phone, a Smart phone, a cellular phone, a personal digital assistant (PDA), an MP3 player, a portable media player (PMP), an automotive navigation system (for example, a global positioning system), and the like. Also, the portable device as used throughout the present specification includes a digital camera, a plasma display panel, and the like.

The method for rendering the hybrid multi-view according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Further, according to an aspect of the embodiments, any combinations of the described features, functions and/or operations can be provided.

Moreover, the apparatus for processing the image may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A method for processing an image, the method comprising:
    determining, by a processor, a presence of a distortion of each of two images from a plurality of images, including a first image and a second image, based on a disparity between the two images;
    determining to use the first and the second image, from the plurality of images, for generating at least one third image based on the presence of the distortion; and
    generating the at least one third image using the first and the second image,
        wherein a viewpoint of the third image is distinct from a viewpoint of the first imaged and a viewpoint of the second image.

2. The method of claim 1, wherein the distortion is a color distortion between the first image and the second image.

3. The method of claim 1, wherein the presence of the distortion is determined based on a difference between a color of a first pixel of the first image and a color of a second pixel of the second image, and
    wherein the first pixel and the second pixel correspond to one another.

4. The method of claim 3, wherein the pixels corresponding to one another are pixels having identical coordinates, when the second image is warped to the viewpoint of the first image, among pixels of the warped second image and pixels of the first image.

5. The method of claim 1, wherein the distortion is a geometric distortion between the first image and the second image.

6. The method of claim 1, wherein the determining of the at least one of the plural images comprises:
    determining one of the first image and the second image as an image to be used for generating a third image when the distortion is present, and when the distortion is absent, determining a total of the first image and the second image to be an image to be used in generating the third image.

7. The method of claim 1,
    wherein the determining the presence of a distortion further comprises determining a presence of the distortion based on the estimated disparity of a first line of the first image and a second line of the second image.

8. The method of claim 7, wherein the second line of the second image comprises a plurality of second lines of the second image,
    wherein the determining the presence of the distortion comprises determining the distortion to be present when a y-coordinate of the first line differs from a y-coordinate of a line matched to the first line among the plurality of second lines, and
    wherein the line matched to the first line has a value of matching error of second lines that is at a minimum.

9. The method of claim 8, wherein a y-coordinate of the plurality of second lines is located in a predetermined range, such that the y-coordinate of the first line corresponds to a line that is at a center of the predetermined range.

10. The method of claim 1, wherein the at least one third image is a plurality of images, and
    respective disparities of the plurality of third images is determined based on a comparison between a range of a disparity representable by an apparatus for processing the image and a range of a disparity of the determined at least one image.

11. The method of claim 10, wherein the range of the disparity of the determined at least one image is determined based on disparity ranges calculated from a plurality of viewpoints.

12. The method of claim 11, wherein the plurality of viewpoints for the plurality of third images are generated to be within a range of a viewpoint corresponding to a representable disparity range.

13. The method of claim 12, wherein a fourth image is generated by applying interpolation to the first image and the second image.

14. A non-transitory computer-readable medium comprising a program for instructing a computer to perform the method of claim 1.

15. An apparatus for processing an image, the apparatus comprising:
- a distortion determining unit to determine a presence of a distortion of each of two images from a plurality of images, including a first image and a second image, based on a disparity between the two images;
- an image determining unit to determine to use the first and the second image, from the plurality images, for generating at least one third image based on the presence of the distortion; and
- an image generating unit to generate the third image using the first and the second image,
    - wherein a viewpoint of the third image is distinct from a viewpoint of the first image and a viewpoint of the second image.

16. The apparatus of claim 15,
wherein the distortion determining unit determines a presence of the distortion based on the estimated disparity of a first line of the first image and a second line of the second image.

17. The apparatus of claim 16, wherein the second line of the second image comprises a plurality of second lines of the second image,
- the distortion determining unit determines that the distortion is present when a y-coordinate of the first line differs from a y-coordinate of a line matched to the first line among the plurality of second lines, and
- wherein a matching error value of the line matched to the first line with the first line among the plurality of second lines is at a minimum.

18. The apparatus of claim 17, wherein the matching error is a degree to which complete matching is not performed in matching of lines.

19. A method for generating a multi-view image, the method comprising:
- determining, by a processor, a presence of a distortion of each of two images from a plurality of images, including a first image and a second image, based on a disparity between the two images;
- selecting, by the processor, the first and the second image, from among a plurality of images, based on the disparity between the first and the second image; and
- generating the multi-view image using the first and the second image, based on the presence of the distortion,
- wherein a viewpoint of the multi-view image is distinct from a viewpoint of the first image and a viewpoint of the second image.

* * * * *